(12) United States Patent
Bhargava et al.

(10) Patent No.: US 6,575,148 B1
(45) Date of Patent: Jun. 10, 2003

(54) HUMIDITY COMPENSATION SYSTEM FOR AN INTERNAL COMBUSTION ENGINE

(75) Inventors: Sumit Bhargava, Columbus, IN (US); David Dunnuck, Columbus, IN (US)

(73) Assignee: Cummins, Inc., Columbus, OH (US)

( * ) Notice: Subject to any disclaimer, the term of this patent is extended or adjusted under 35 U.S.C. 154(b) by 0 days.

(21) Appl. No.: 10/080,722

(22) Filed: Feb. 22, 2002

(51) Int. Cl.[7] ............................................... F02B 33/00
(52) U.S. Cl. .............. 123/564; 123/406.19; 123/406.55
(58) Field of Search ................................ 60/602, 605.1; 123/564, 406.12, 406.19, 406.55

(56) References Cited

U.S. PATENT DOCUMENTS

| | | | |
|---|---|---|---|
| 4,046,113 A | | 9/1977 | Moore |
| 5,446,665 A | * | 8/1995 | Adrian et al. ................ 123/486 |
| 5,586,524 A | * | 12/1996 | Nonaka et al. .............. 123/478 |
| 5,597,951 A | | 1/1997 | Yoshizaki et al. |
| 5,703,777 A | | 12/1997 | Buchhop et al. |
| 5,735,245 A | | 4/1998 | Kubesh et al. |
| 6,062,204 A | * | 5/2000 | Cullen ................... 123/406.12 |
| 6,189,523 B1 | | 2/2001 | Weisbrod et al. |
| 6,209,515 B1 | | 4/2001 | Gotoh et al. |

OTHER PUBLICATIONS

Kubesh, John T. and Podnar, Daniel J., "Humidity Effects and Compensation in a Lean Burn Natural Gas Engine," SAE Technical Paper Series, Society of Automotive Engineers, Inc., 1997, pp. 33–40.

* cited by examiner

*Primary Examiner*—Hoang Nguyen
(74) *Attorney, Agent, or Firm*—Barnes & Thornburg

(57) ABSTRACT

A humidity compensation system for an internal combustion engine includes a humidity sensor sensing relative humidity of intake air, a temperature sensor sensing intake air temperature, a pressure sensor sensing intake air pressure and a control circuit computing a specific humidity (SH) value based on the sensor outputs. The control circuit is configured to compute one or more of an adjusted air-to-fuel ratio command as a function of SH and a default air-to-fuel ratio command, an adjusted ignition timing command as a function of SH, engine speed and a default ignition timing command and an adjusted boost pressure command as a function of SH and a default boost pressure command. The control circuit is operable to control any of fueling, ignition timing and boost pressure based on the corresponding adjusted air-to-fuel ratio, ignition timing and boost pressure commands to thereby compensate for humidity effects on engine operation.

30 Claims, 2 Drawing Sheets

HUMIDITY COMPENSATION SYSTEM FOR AN INTERNAL COMBUSTION ENGINE

FIELD OF THE INVENTION

The present invention relates generally to systems for controlling the operation of an internal combustion engine, and more specifically to systems for compensating for atmospheric humidity effects on the operation of an internal combustion engine.

BACKGROUND OF THE INVENTION

Differing levels of specific humidity in the atmosphere are known to impact the operation of internal combustion engines generally, and of spark-ignited engines in particular. For example, in spark-ignited, natural gas engines, increased levels of specific humidity tend to slow combustion by decreasing heat release rates and also by increasing the duration of individual combustion events.

Heretofore, systems have been devised to compensate for such adverse humidity effects by manipulating three main engine operating parameters; namely lambda ($\lambda$), which is generally a function of air-to-fuel ratio, ignition timing and, in cases where the engine includes a turbocharger, boost pressure. One such system is described in U.S. Pat. No. 5,735,245 to Kubesh et al. which discloses a control system for determining specific humidity as a function of relative humidity and intake air temperature, and modifying fuel flow, spark timing and boost pressure commands as a function of the computed specific humidity.

However, the Kubesh et al. system has a number of drawbacks associated therewith. For example, in addition to specific humidity the modified fuel flow command is also a function of the oxygen content of the engine exhaust gas, and the Kubesh et al. system thus requires a universal exhaust gas oxygen (UEGO) sensor for operation thereof. This unnecessarily adds system cost and raises reliability concerns as well. As another example, the modified spark timing command in the Kubesh et al. system is a function only of the specific humidity value and a default spark timing command. Since spark timing is known to vary as a function of other engine operating conditions, the Kubesh et al. spark timing modification technique is capable of accurately modifying spark timing only in a narrow range of such engine operating conditions.

What is therefore needed is a humidity compensation system that overcomes the foregoing drawbacks and provides a low-cost, highly accurate humidity compensation strategy.

SUMMARY OF THE INVENTION

The foregoing shortcomings of the prior art are addressed by the present invention. In accordance with one aspect of the present invention, a humidity compensation system for an internal combustion engine comprises means for determining a specific humidity of air entering an intake manifold of an internal combustion engine, a fuel system responsive to a fueling command to supply fuel to the engine and a control circuit determining an adjusted air-to-fuel ratio command as a function of the specific humidity and a default air-to-fuel ratio command, the control circuit producing the fueling command as a function of the adjusted air-to-fuel ratio command.

In accordance with another aspect of the present invention, a method of compensating for atmospheric humidity effects on the operation of an internal combustion engine comprises determining a specific humidity of air entering an intake manifold of an internal combustion engine, computing an adjusted air-to-fuel ratio command as a function of the specific humidity and a default air-to-fuel ratio command, and fueling the engine based on the adjusted air-to-fuel ratio command.

In accordance with a further aspect of the present invention, a humidity compensation system for an internal combustion engine comprises means for determining a specific humidity of air entering an intake manifold of an internal combustion engine, an engine speed sensor producing an engine speed signal indicative of a rotational speed of the engine, an ignition system responsive to a timing signal to ignite an air-fuel mixture within the engine, and a control circuit determining an adjusted ignition timing command as a function of the specific humidity, the engine speed signal and a default ignition timing command, the control circuit producing the timing signal as a function of the adjusted ignition timing command.

In accordance with still a further aspect of the present invention, a method of compensating for atmospheric humidity effects on the operation of an internal combustion engine comprises determining a specific humidity of air entering an intake manifold of an internal combustion engine, determining a rotational speed of the engine, computing an adjusted ignition timing command as a function of the specific humidity, the rotational speed of the engine and a default ignition timing command, and controlling ignition timing of the engine based on the adjusted ignition timing command.

These and other objects of the present invention will become more apparent from the following description of the preferred embodiments.

DESCRIPTION OF THE PREFERRED EMBODIMENTS

Figure 1:
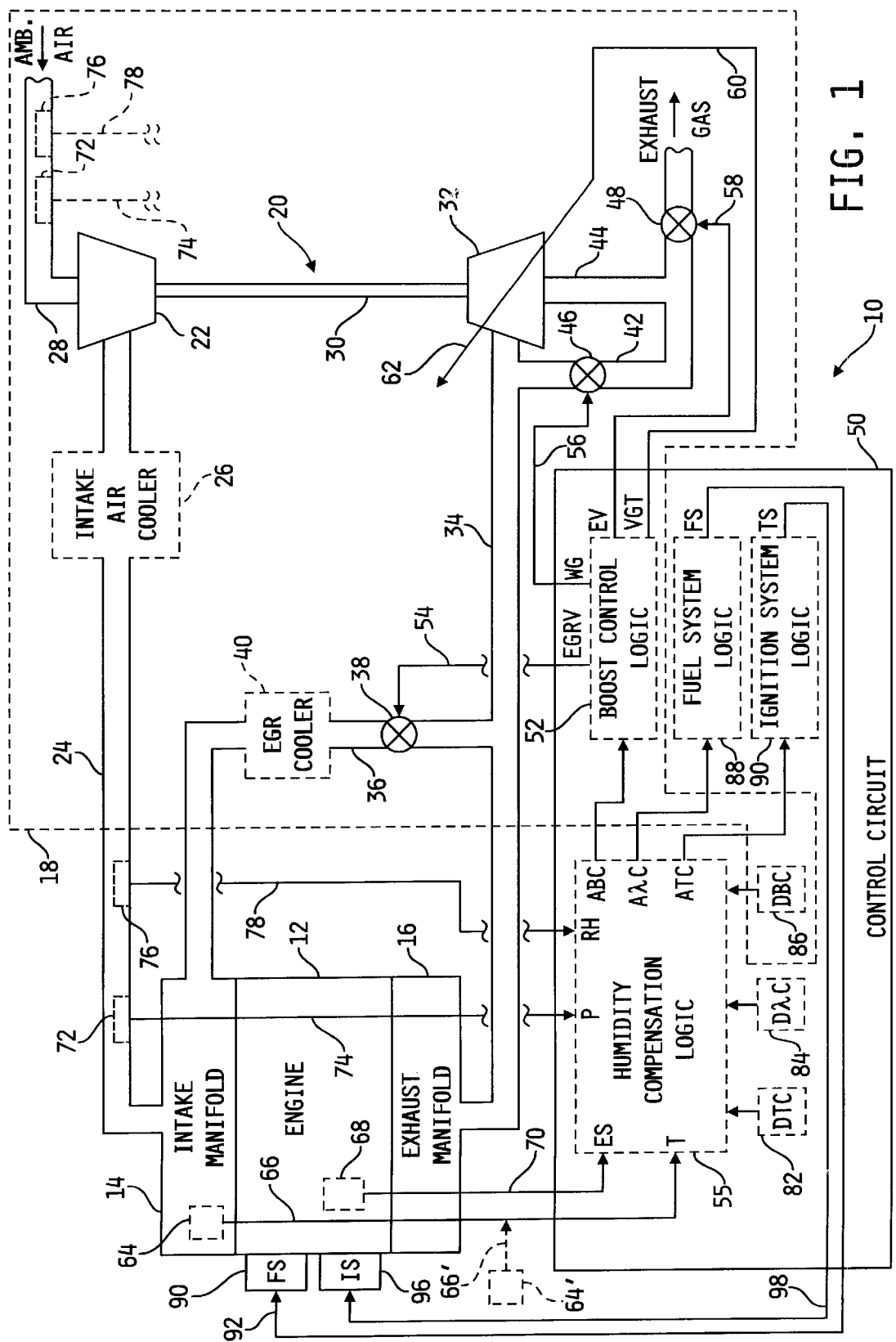
FIG. 1 is a diagrammatic illustration of one preferred embodiment of a humidity compensation system for an internal combustion engine, in accordance with the present invention.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, one preferred embodiment of a humidity compensation system 10 for an internal combustion engine, in accordance with the present invention, is shown. System 10 includes an internal combustion engine 12 having an intake manifold 14 and an exhaust manifold 16 coupled thereto as is known in the art. In one embodiment, system 10 includes an air handling system 18 that includes a turbocharger 20 and/or an exhaust gas recirculation (EGR)

arrangement 36, 38. In this embodiment, turbocharger 20 includes a compressor 22 having a compressor outlet fluidly coupled to intake manifold 14 via conduit 24 and a compressor inlet fluidly coupled to ambient via conduit 28. Optionally, as shown in phantom in FIG. 1, air handling system 18 may include an intake air cooler 26 disposed in-line with conduit 24 for cooling intake air provided by compressor 22. Turbocharger 20 further includes a turbine 32 that is rotatably coupled to compressor 22 via shaft 30, and has a turbine inlet fluidly coupled to exhaust manifold 16 via conduit 34 and a turbine outlet fluidly coupled to ambient via conduit 44.

Air handling system 18 may include a conduit 36 having one end fluidly coupled to exhaust conduit 34 and an opposite end fluidly coupled to the intake manifold 14. An EGR valve 38 is disposed in-line with conduit 36, wherein EGR valve 38 may be manipulated in a manner well-known in the art to control the rate or amount of exhaust gas flowing from exhaust manifold 16 to intake manifold 14. Optionally, as shown in phantom in FIG. 1, air handling system 18 may include an EGR cooler 40 disposed in-line with conduit 36 between EGR valve 38 and intake manifold 14.

Air handling system 18 may further include a wastegate valve 46 disposed in-line with a conduit 42, wherein conduit 42 is fluidly coupled at one end to exhaust conduit 34 and at an opposite end to exhaust conduit 44. Exhaust conduit 44 may further include an exhaust valve or throttle 48 disposed in-line with conduit 44. In cases where air handling system 18 includes both a wastegate valve 46 and an exhaust valve 48, those skilled in the art will recognize that the outlet of wastegate valve 46 may be connected to conduit 44 upstream of exhaust valve 48 as illustrated in FIG. 1, or may alternatively be connected to conduit 44 downstream of exhaust valve 48. In any case, turbocharger 20 may be a variable geometry turbocharger (VGT) wherein the physical geometry of turbine 32, and hence its swallowing capacity, may be electronically and/or mechanically controlled by a VGT actuator illustrated generally in FIG. 1 by through-arrow 62.

As is well known in the art, turbocharger turbine 32 includes a turbine wheel (not shown) that is rotated by exhaust gases flowing from exhaust manifold 16 through exhaust conduits 34 and 44. The turbine wheel is mechanically coupled to shaft 30 such that rotation of the turbine wheel is transferred through shaft 30 to a compressor wheel (not shown) of turbocharger compressor 22. Rotation of the compressor wheel increases the amount of air drawn through conduit 28 and provided to intake manifold 14 via conduit 24. The increased air pressure within conduit 24 resulting from excess air drawn in through conduit 28 via action of the compressor 22 is typically referred to as "boost pressure", wherein boost pressure is a function of the rotational speed of the turbine wheel contained within turbine 32. It is generally understood that the rotational speed of the turbine wheel within turbine 32, and hence the boost pressure supplied by turbocharger compressor 22, may be controlled through appropriate control of any one or more of the wastegate valve 46, exhaust valve 48 and/or VGT actuator 62. Boost pressure may be additionally modified, as is known in the art, via actuation of EGR valve 38, wherein EGR valve 38 may be controlled to supply selectable amounts of recirculated exhaust gas from exhaust conduit 34 to intake manifold 14 for the purpose of reducing NOx content of the exhaust gases produced by engine 12, as is known in the art.

In an alternative embodiment of system 10, air handling system 18 is omitted, and conduits 24 and 28 are merged into a single conduit supplying ambient air directly to intake manifold 14. Conduits 34 and 44 are likewise merged into a single conduit configured to expel engine exhaust gas from exhaust manifold 16 directly to ambient.

System 10 includes a control circuit 50 that is preferably microprocessor-based and is generally operable to control and manage the overall operation of engine 12. Control circuit 50 includes conventional memory as well as a number of inputs and outputs for interfacing with various sensors and systems coupled to engine 12. Control circuit 50, in one embodiment, may be a known control unit sometimes referred to as an electronic or engine control module (ECM), electronic or engine control unit (ECU) or the like, or may alternatively be any control circuit capable of operation as described hereinafter.

In accordance with the present invention, control circuit 50 includes a humidity compensation logic block 55 receiving a number of input signals from various sensors. For example, in one embodiment, intake manifold 14 includes an intake manifold temperature sensor 64 in fluid communication therewith and electrically connected to a temperature input (T) of humidity compensation logic block 55. Temperature sensor 64 may be of known construction and is operable to produce a temperature signal on signal path 66 indicative of the temperature of air entering intake manifold 14.

Engine 12 includes an engine speed sensor 68 electrically connected to an engine speed input (ES) of humidity compensation logic block 55 via signal path 70. In one embodiment, engine speed sensor 68 is a known Hall-effect sensor operable to sense passage thereby of a number of teeth formed on a gear or tone wheel rotating synchronously with the engine crank shaft. Alternatively, engine speed sensor 68 may be a known variable reluctance sensor, or the like. In any case, engine speed sensor 68 is configured to produce an engine speed signal on signal path 70 indicative of rotational speed of the engine 12.

System 10 further includes a pressure sensor 72 of known construction and electrically connected to a pressure input (P) of humidity compensation block 55 via signal path 74. In one embodiment, pressure sensor 72 is disposed in fluid communication with intake conduit 24, and is operable to produce a pressure signal indicative of air pressure within conduit 24, which corresponds to the pressure of air entering the intake manifold 14.

System 10 further includes a relative humidity sensor 76 of known construction and electrically connected to a relative humidity input (RH) of humidity compensation logic block 55 via signal path 78. In one embodiment, relative humidity sensor 76 is disposed in fluid communication with intake conduit 24, and in embodiments including air-handling system 18 with intake air cooler 26, it is desirable to locate sensor 76 between intake air cooler 26 and intake manifold 14 as illustrated in FIG. 1. The relative humidity sensor 76 is operable to produce a humidity signal indicative of the relative humidity of air flowing through conduit 24, which corresponds to the relative humidity of air entering intake manifold 14.

In embodiments of system 10 including an air handling system 18, such embodiments may typically include an existing intake manifold temperature sensor such as sensor 64 shown and described with respect to FIG. 1. In such embodiments, it is desirable to locate the pressure sensor 72 and relative humidity sensor 76 in fluid communications with conduit 24, as shown in FIG. 1, so that the existing temperature signal produced by sensor 64 may be used in the computation of a specific humidity value for use by the humidity compensation block 55 as will be described in greater detail hereinafter. By locating sensors 72 and 76 in fluid communications with conduit 24, the need for an additional temperature sensor for determining the temperature of air flowing past sensors 72 and 76 is thereby avoided. In embodiments of system 10 with air handling system 18 that do not include an existing intake manifold temperature sensor 64, a suitable temperature sensor must be provided either in fluid communications with conduit 24 or within intake manifold 14.

Alternatively, including embodiments that do not have air handling system 18, the pressure and relative humidity sensors 72 and 76 may be positioned in fluid communication with ambient air intake conduit 28, as shown in phantom in FIG. 1, or disposed in some other suitable location to provide signals indicative of ambient air pressure and relative humidity of ambient air, respectively. In such embodiments, an ambient air temperature sensor 64' must also be provided to produce a temperature signal on signal path 66 (via signal path 66') indicative of ambient air temperature. Sensor 64' may be positioned within ambient air conduit 28 or disposed in some other suitable location, as shown in phantom in FIG. 1.

Control circuit 50 includes a default timing block 82, wherein block 82 includes known logic for generating a default ignition timing command DTC in a manner wellknown in the art. Control circuit 50 further includes an ignition system logic block 90 having an output electrically connected by signal path 98 to an ignition system 96 of known construction that is operatively coupled to engine 12. Ignition system logic block 90 includes known logic that is responsive to at least a timing command to produce a timing signal TS on signal path 98. Ignition system 96 is, in turn, responsive to the timing signal TS on signal path 98 to ignite an air-fuel mixture within any one or more of the various cylinders within engine 12. Ignition system logic block 90 is thus operable to control ignition timing of engine 12 as a function of at least a timing command in a manner well-known in the art.

Control circuit 50 further includes a default $\lambda$ (lambda) command block 84 producing a default $\lambda$ command D$\lambda$C. Lambda is a generally a function of air-to-fuel ratio, and one known representation of $\lambda$ is defined as a ratio of air-to-fuel ratio and stoichiometeric air-to-fuel ratio. For purposes of this description and claims appended hereto, however, the terms "air-to-fuel ratio" and "lambda" ( or "$\lambda$") will be used interchangeably and will be understood to define either an air-to-fuel ratio alone or a ratio of air-to-fuel ratio and stoichiometric air-to-fuel ratio. In any case, control circuit 50 further includes a fuel system logic block 88 that is electrically connected via signal path 92 to a fuel system 90 of known construction and operatively coupled to engine 12. Fuel system logic block 88 includes known logic that is responsive to at least a $\lambda$, or air-to-fuel ratio, command to produce a fueling signal FS. The fuel system 90 is, in turn, responsive to the fuel signal FS to supply fuel to engine 12 in a manner well-known in the art. Fuel system logic block 88 is thus operable to control fueling of engine 12 of a function of at least a $\lambda$, or air-to-fuel ratio, command in a known manner.

In embodiments of system 10 including air handling system 18, control circuit 50 further includes a default boost pressure command block 86 producing a default boost pressure command DBC in a known manner. In this embodiment, control circuit 50 further includes a boost control logic block 52 electrically connected to EGR valve 38 via signal path 54, to wastegate valve 46 via signal path 56, to exhaust valve 48 via signal path 58, and/or to VGT actuator 62 via signal path 60. Boost control logic block 52 includes known logic for controlling the boost pressure within intake conduit 24 by controlling any one or more of the foregoing actuators within air handling system 18 as a function of at least a boost pressure command in a manner well-known in the art. For example, boost control logic block 52 may include a first output producing an EGR valve control signal EGRV on signal path 54, wherein boost control logic block 52 is operable to control the position of EGR valve 38 via appropriate control of the EGRV signal, thereby introducing additional air flow (in the form of exhaust gas) into the intake conduit 24 and diverting some exhaust gas away from turbine 32, and in either case accordingly affecting the boost pressure within intake conduit 24. Boost control logic block 52 may include a second output producing a wastegate control signal WG on signal path 56, wherein boost control logic block 52 is operable to control the position of wastegate valve 46 through appropriate control of the wastegate signal WG. The wastegate valve 46 may thus be modulated to selectively divert exhaust gas flow away from turbine 32, thereby modulating the swallowing capacity of turbine 32 and accordingly affecting the boost pressure within the intake conduit 24. Boost control logic block 52 may include a third output producing an exhaust valve signal EV on signal path 58, wherein boost control logic block 52 is operable to control the position of exhaust valve 48 through appropriate control of the exhaust valve signal EV. The exhaust valve 48 may thus be modulated to selectively restrict the flow of exhaust gas from turbine 32, thereby modulating the swallowing capacity of turbine 32 and accordingly affecting the boost pressure within the intake conduit 24. Likewise, boost control logic block 52 may include a fourth output producing a VGT control signal on signal path 60, wherein boost control logic block 52 is operable to control the physical geometry of turbocharger turbine 32 through appropriate control of the VGT control signal VGT. The VGT actuator 62 may thus be modulated to control the physical geometry of the turbine 32, thereby modulating the swallowing capacity of turbine 32 and accordingly affecting the boost pressure within the intake conduit 24. Those skilled in the art will recognize that boost control logic block 52 may be responsive to a boost pressure command to effectuate corresponding control of boost pressure within intake conduit 24 by controlling any one or more of the EGR valve 38, wastegate valve 46, exhaust valve 48, and VGT actuator 62. In embodiments of system 10 that do not include air-handing system 18, boost control logic block 52 may be omitted from control circuit 50.

In accordance with the present invention, the humidity compensation logic block 55 of control circuit 50 is configured to receive the default timing command DTC from default timing command block 82, the default $\lambda$ command D$\lambda$C from the default $\lambda$ command block 84 and, in cases where system 10 includes air-handling system 18, the default boost pressure command DBC from the reference boost pressure command block 86. The humidity compensation logic block 55 is operable to modify the foregoing default commands, in a manner to be described more fully hereinafter with respect to FIG. 2, and to produce corresponding adjusted command values. For example, humidity compensation logic block 55 is operable to modify the default timing command DTC and provide a corresponding adjusted timing command ATC to ignition system logic block 90. Likewise, humidity compensation logic block 55 is operable to modify the default λ command DλC and provide a corresponding adjusted λ command AλC to fuel system logic block 88. Similarly, in case where system 10 includes air-handling system 18, humidity compensation logic block 55 is operable to modify the default boost pressure command DBC and provide a corresponding adjusted boost pressure command ABC to boost control logic block 52. In embodiments of system 10 that do not include air-handling system 18, the default boost command block 86 is omitted and the humidity compensation logic block 55 is configured to receive only the default timing and λ commands DTC and DλC respectively, and produce only corresponding adjusted timing and λ commands ATC and AλC respectively.

Figure 2:
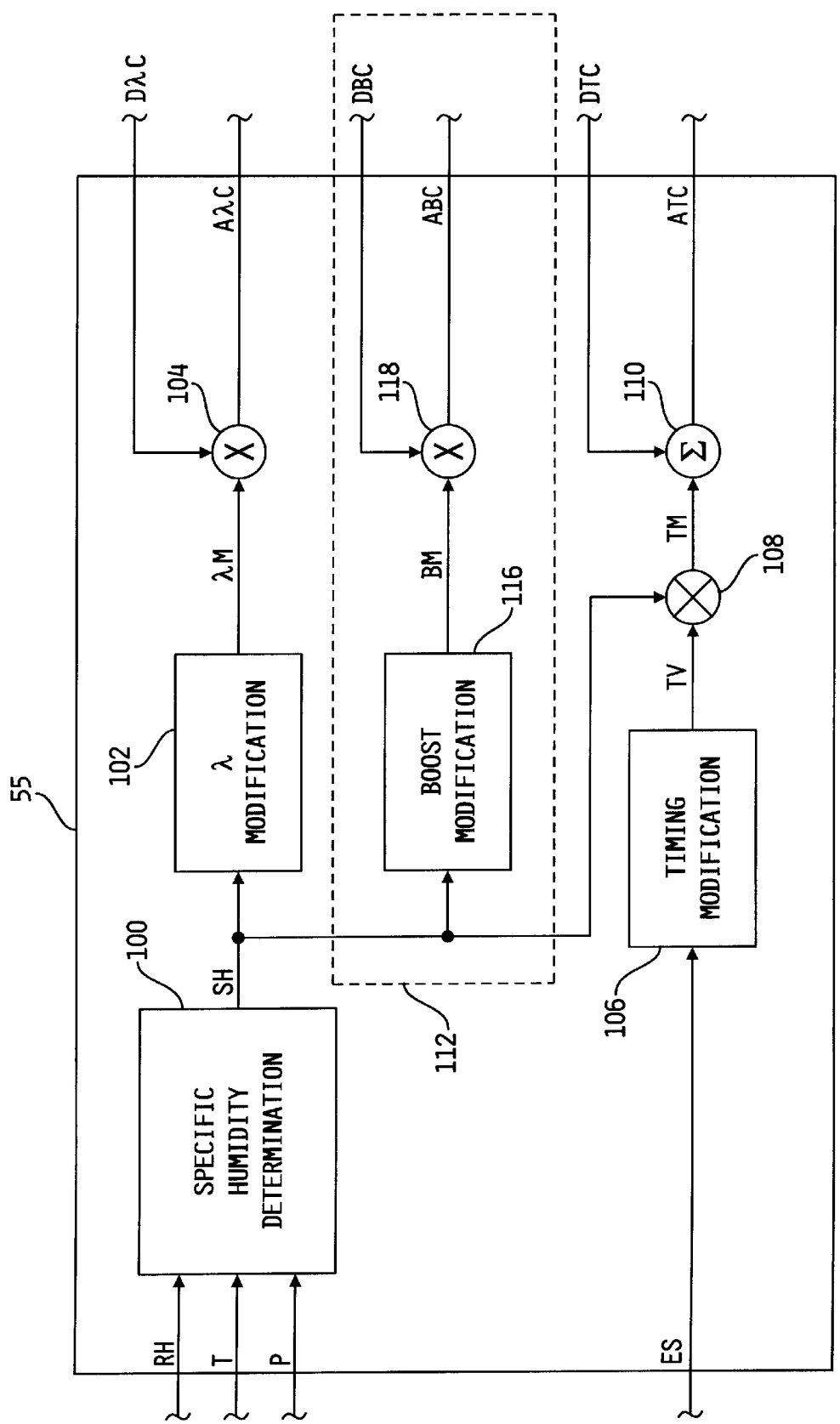
FIG. 2 is a block diagram illustration of one preferred embodiment of the humidity compensation logic block of FIG. 1, in accordance with the present invention.

Referring now to FIG. 2, one preferred embodiment of the humidity compensation block 55, in accordance with the present invention, is shown. Block 55 includes a specific humidity determination block 100 receiving the relative humidity signal at input RH, the temperature signal at input T and the pressure signal at input P. Block 100 is operable to compute a specific humidity value SH as a known function thereof. In one embodiment, block 100 includes one or more known equations defining the specific humidity value SH as a function of RH, T and P. Alternatively, block 100 may be implemented as one or more tables or graphical representations defining SH as a function of RH, T and P. In any case, the specific humidity value SH produced by block 100 corresponds to the specific humidity of air in fluid communication with each of the temperature, pressure and relative humidity sensors 64 (or 64'), 72 and 76 respectively.

The humidity compensation block 55 further includes a λ modification block 102 receiving the specific humidity value SH from block 100 and producing a λ modifier value λM as a function thereof. The λ modifier value λM is provided to one input of a multiplier 104 having a second input receiving the default λ command DλC. The output of the multiplier 104 is the product of the default λ command DλC and the λ modifier value λM, and is the adjusted λ command value AλC produced by humidity compensation logic block 55.

The λ modification block 102 is responsive to the current value of specific humidity to produce the λ modifier λM as a function thereof. In one embodiment, block 102 is implemented as a 2-dimensional look-up table including a number of specific humidity values mapped to corresponding λ modifier values λM, wherein block 102 preferably uses known interpolation techniques to produce an appropriate λ modifier value λM for any specific humidity value SH. Alternatively, the present invention contemplates implementing block 102 in the form of multiple tables of the type just described, one or more graphs, one or more equations relating SH to λM, or the like. It should further be understood that although the illustrative embodiment of humidity compensation logic block 55 shown in FIG. 2 implements the λ modifier λM as a multiplier value to be multiplied by the default λ value DλC to produce the adjusted λ command AλC, the present invention alternatively contemplates implementing the λ modifier λM as an additive, subtractive or divider value to be correspondingly added to, subtracted from or divided by, the default λ value DλC to produce the adjusted λ command AλC.

In one embodiment of the present invention, the default λ command DλC corresponds to a so-called "dry" λ value representing a λ value referenced to zero grains of specific humidity. It is to be understood, however, that the present invention contemplates referencing the default λ command to any fixed humidity level. In any case, the λ modification values λM produced by λ modification block 102 are necessarily based on the reference humidity level of the default λ commands DλC such that the resulting adjusted λ commands AλC accurately reflect desired λ command values for the current specific humidity conditions. For example, if the default λ commands DλC represent "dry λ" values; i.e., λ commands referenced to zero grains of specific humidity, the λ modification values λM produced by λ modification block 102 are chosen such that the resulting adjusted λ command values AλC reflect appropriate modification of the default λ commands DλC referenced to zero grains of specific humidity. Likewise, if the default λ commands DλC are referenced to some other constant level of specific humidity, the λ modification values λM produced by λ modification block 102 are chosen such that the resulting adjusted λ command values AλC reflect appropriate modification of the default λ commands DλC referenced to that constant level of specific humidity, and so forth.

The humidity compensation block 55 further includes a timing modification block 106 receiving the engine speed signal produced by engine speed sensor 68 and producing a timing value TV as a function thereof. The timing value TV is provided to one input of a multiplier 108 having a second input receiving the specific humidity value SH produced by the specific humidity determination block 100. The product of the timing value TV and the specific humidity value SH is a timing modification value TM, which is provided by the output of the multiplier 108 to one input of a summation node 110. A second input of summation node 110 receives the default timing command DTC, and the sum of the timing modification value TM and the default timing command DTC is the adjusted timing command ATC produced by humidity compensation logic block 55.

The timing modification block 106 is responsive to the current value of the engine speed signal ES to produce the timing value TV as a function thereof. In one embodiment, block 106 is implemented as a 2-dimensional look-up table including a number of engine speed values mapped to corresponding timing values TV, wherein block 106 preferably uses known interpolation techniques to produce an appropriate timing value TV for any engine speed value ES. Alternatively, the present invention contemplates implementing block 106 in the form of multiple tables of the type just described, one or more graphs, one or more equations relating ES to TV, or the like.

The timing value TV is multiplied by the specific humidity value SH by multiplier 108 to produce the timing modification value TM. It is to be understood that although the illustrative embodiment of humidity compensation logic block 55 shown in FIG. 2 implements the timing value TV as a multiplier value to be multiplied by the specific humidity value SH to produce the timing modification value TM, the present invention alternatively contemplates implementing the timing value TV as an additive, subtractive or divider value to be correspondingly added to, subtracted from or divided by, the specific humidity value SH to produce the timing modification value TM.

The timing modification value TM is added to the default timing command DTC by summation node 110 to produce the adjusted timing command ATC. It is to be understood that although the illustrative embodiment of humidity compensation logic block 55 shown in FIG. 2 implements the timing modification value TM as an additive value to be added to the default timing command to produce the adjusted timing command ATC, the present invention alternatively contemplates implementing the timing modification value TM as a subtractive, multiplier or divider value to be correspondingly subtracted from, multiplied or divided by, the default timing value DTC to produce the adjusted timing command ATC.

In embodiments where the system 10 illustrated in FIG. 1 does not include an air handling system 18, the humidity compensation logic block 55 may be limited to the logic functions just described. However, in cases where system 10 does include an air handling system 18, and therefore includes any one or more of the air handling system components shown and described with respect to FIG. 1, the humidity compensation logic block 55 may optionally include a boost pressure compensation logic block 112 as shown in FIG. 2. In such embodiments, the humidity compensation block 55 further includes a boost modification block 116 receiving the specific humidity value SH from block 100 and producing a boost modifier value BM as a function thereof. The boost modifier value BM is provided to one input of a multiplier 118 having a second input receiving the default boost command DBC. The output of the multiplier 118 is the product of the default boost command DBC and the boost modifier value BM, and is the adjusted boost command value ABC produced by humidity compensation logic block 55.

The boost modification block 116 is responsive to the current value of specific humidity to produce the boost modifier BM as a function thereof. In one embodiment, block 102 is implemented as an equation of the form BM=(1+SH/C), where C is a unit conversion value for converting humidity units to boost pressure units. In one illustrative embodiment, C may be, for example, a value for converting humidity units of grains to boost pressure units of lbm (e.g., 7000 gr/lbm), although it should be understood that the present invention contemplates other values and/or units of the constant C for converting any humidity units to any boost pressure units. In alternative embodiments, the present invention contemplates implementing block 116 in the form of one or more look-up tables, one or more graphs, one or more equations relating SH to BM, or the like, wherein any such implementation of block 116 may follow the general equation for BM just described or may alternatively follow another desired relationship between BM and SH. It should further be understood that although the illustrative embodiment of humidity compensation logic block 55 shown in FIG. 2 implements the boost modifier BM as a multiplier value to be multiplied by the default boost value DBC to produce the adjusted boost command ABC, the present invention alternatively contemplates implementing the boost modifier BM as an additive, subtractive or divider value to be correspondingly added to, subtracted from or divided by, the default boost value DBC to produce the adjusted boost command ABC.

In one preferred embodiment, the default boost command DBC corresponds to a so-called "dry" boost value representing a boost value referenced to zero grains of specific humidity. It is to be understood, however, that the present invention contemplates referencing the default boost command to any fixed humidity level. In any case, the boost modification values BM produced by boost modification block 116 are necessarily based on the reference humidity level of the default boost commands DBC such that the resulting adjusted boost commands ABC accurately reflect desired boost command values for the current specific humidity conditions. For example, if the default boost commands DBC represent "dry boost" values; i.e., boost commands referenced to zero grains of specific humidity, the boost modification values BM produced by boost modification block 116 are chosen such that the resulting adjusted boost command values ABC reflect appropriate modification of the default boost commands DBC referenced to zero grains of specific humidity. Likewise, if the default boost commands DBC are referenced to some other constant level of specific humidity, the boost modification values BM produced by boost modification block 116 are chosen such that the resulting adjusted boost command values ABC reflect appropriate modification of the default boost commands DBC referenced to that constant level of specific humidity, and so forth.

It should now be apparent from the foregoing that the present invention is directed to compensating one or more engine operating parameters for effects on engine operation due to variations in the ambient specific humidity level. In embodiments wherein the system 10 does not include an air handling system, including one or more of the components of air handling system 18 shown and described with respect to FIG. 1, it is desirable to modify either, or both of, the air-to-fuel ratio λ and the ignition timing generally as a function of the ambient specific humidity level. In cases where the system 10 includes an air handling system, including one or more of the components of air handling system 18 shown and described with respect to FIG. 1, it is desirable to modify any one, or combination of, the air-to-fuel ratio λ, the ignition timing and the boost pressure, generally as a function of the ambient specific humidity level.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A humidity compensation system for an internal combustion engine, comprising:
    means for determining a specific humidity of air entering an intake manifold of an internal combustion engine;
    a fuel system responsive to a fueling command to supply fuel to said engine; and
    a control circuit determining an adjusted air-to-fuel ratio command as a function of said specific humidity and a default air-to-fuel ratio command, said control circuit producing said fueling command as a function of said adjusted air-to-fuel ratio command.

2. The system of claim 1 wherein said control circuit is configured to determine an air-to-fuel multiplier as a function of said specific humidity and to determine said adjusted air-to-fuel ratio command as a product of said air-to-fuel multiplier and said default air-to-fuel command.

3. The system of claim 2 wherein said control circuit includes an air-to-fuel multiplier map mapping a number of specific humidity values to a corresponding number of air-to-fuel multiplier values, said control circuit determining said air-to-fuel multiplier by mapping said specific humidity to an appropriate one of said number of air-to-fuel multiplier values.

4. The system of claim 1 further including:
    a turbocharger having a turbine configured to discharge engine exhaust gas therefrom; and
    means responsive to an airflow signal to modify a swallowing capacity of said turbine;
    and wherein said control circuit is configured to determine an adjusted boost pressure command as a function of said specific humidity and a default boost pressure command, said control circuit producing said airflow signal as a function of said adjusted boost pressure command.

5. The system of claim 4 wherein said control circuit is configured to compute a boost multiplier as a function of said specific humidity and to compute said adjusted boost pressure command as a product of said boost multiplier and said default boost pressure command.

6. The system of claim 5 wherein said control circuit includes a boost multiplier map mapping a number of specific humidity values to a corresponding number of boost multiplier values, said control circuit determining said boost multiplier by mapping said specific humidity to an appropriate one of said number of boost multiplier values.

7. The system of claim 1 further including:
an engine speed sensor producing an engine speed signal indicative of rotational speed of said engine; and
an ignition system responsive to a timing signal to ignite an air-fuel mixture within said engine;
and wherein said control circuit is configured to determine an adjusted ignition timing command as a function of said specific humidity, said engine speed signal and a default ignition timing command, said control circuit producing said timing signal as a function of said adjusted ignition timing command.

8. The system of claim 7 wherein said control circuit is configured to determine a timing multiplier as a function of said engine speed signal and to determine a timing modifier as a product of said timing multiplier and said specific humidity, said control circuit determining said adjusted ignition timing command as a sum of said timing modifier and said default ignition timing command.

9. The system of claim 8 wherein said control circuit includes a timing multiplier map mapping a number of specific engine speed values to a corresponding number of timing multiplier values, said control circuit determining said timing multiplier by mapping a current value of said engine speed signal to an appropriate one of said number of timing multiplier values.

10. The system of claim 9 further including:
a turbocharger having a turbine configured to discharge engine exhaust gas therefrom; and
means responsive to an airflow signal to modify a swallowing capacity of said turbine;
and wherein said control circuit is configured to determine an adjusted boost pressure command as a function of said specific humidity and a default boost pressure command, said control circuit producing said airflow signal as a function of said adjusted boost pressure command.

11. The system of claim 10 wherein said control circuit is configured to compute a boost multiplier as a function of said specific humidity and to compute said adjusted boost pressure command as a product of said boost multiplier and said default boost pressure command.

12. The system of claim 11 wherein said control circuit includes a boost multiplier map mapping a number of specific humidity values to a corresponding number of boost multiplier values, said control circuit determining said boost multiplier by mapping said specific humidity to an appropriate one of said number of boost multiplier values.

13. The system of claim 1 wherein said means for determining a specific humidity of air entering said intake manifold of said internal combustion engine includes:
a humidity sensor producing a humidity signal indicative of relative humidity of air entering said intake manifold;
a temperature sensor producing a temperature signal indicative of a temperature of air entering said intake manifold; and
a pressure sensor producing a pressure signal indicative of a pressure of air entering said intake manifold;
and wherein control circuit responsive to said humidity signal, said temperature signal and said pressure signal to determine said specific humidity.

14. The system of claim 1 further wherein said means for determining a specific humidity of air entering said intake manifold of said internal combustion engine includes:
a humidity sensor producing a humidity signal indicative of relative humidity of ambient air;
a temperature sensor producing a temperature signal indicative of ambient air temperature; and
a pressure sensor producing a pressure signal indicative of ambient air pressure;
and wherein control circuit responsive to said humidity signal, said temperature signal and said pressure signal to determine said specific humidity.

15. A method of compensating for atmospheric humidity effects on the operation of an internal combustion engine, comprising:
determining a specific humidity of air entering an intake manifold of an internal combustion engine;
computing an adjusted air-to-fuel ratio command as a function of said specific humidity and a default air-to-fuel ratio command; and
fueling said engine based on said adjusted air-to-fuel ratio command.

16. The method of claim 15 wherein the computing step further includes:
computing an air-to-fuel multiplier as a function of said specific humidity; and
computing said adjusted air-to-fuel ratio command as a product of said air-to-fuel multiplier and said default air-to-fuel ratio command.

17. The method of claim 15 further including:
computing an adjusted boost pressure command as a function of said specific humidity and a default boost pressure command; and
controlling pressure of air entering an intake manifold of said engine based on said adjusted boost pressure command.

18. The method of claim 15 further including:
determining an engine speed value corresponding to a rotational speed of said engine;
computing an adjusted ignition timing command as a function of said specific humidity, said engine speed value and a default ignition timing command; and
controlling ignition timing of said engine based on said adjusted ignition timing command.

19. The method of claim 18 further including:
computing an adjusted boost pressure command as a function of said specific humidity and a default boost pressure command; and
controlling pressure of air entering an intake manifold of said engine based on said adjusted boost pressure command.

20. A humidity compensation system for an internal combustion engine, comprising:
means for determining a specific humidity of air entering an intake manifold of an internal combustion engine;
an engine speed sensor producing an engine speed signal indicative of a rotational speed of said engine;
an ignition system responsive to a timing signal to ignite an air-fuel mixture within said engine; and a control circuit determining an adjusted ignition timing command as a function of said specific humidity, said engine speed signal and a default ignition timing command, said control circuit producing said timing signal as a function of said adjusted ignition timing command.

21. The system of claim 20 wherein said control circuit is configured to determine a timing multiplier as a function of said engine speed signal and to determine a timing modifier as a product of said timing multiplier and said specific humidity, said control circuit determining said adjusted ignition timing command as a sum of said timing modifier and said default ignition timing command.

22. The system of claim 20 wherein said control circuit includes a timing multiplier map mapping a number of specific engine speed values to a corresponding number of timing multiplier values, said control circuit determining said timing multiplier by mapping a current value of said engine speed signal to an appropriate one of said number of timing multiplier values.

23. The system of claim 20 further including:

a turbocharger having a turbine configured to discharge engine exhaust gas therefrom; and means responsive to an airflow signal to modify a swallowing capacity of said turbine;

and wherein said control circuit is configured to determine an adjusted boost pressure command as a function of said specific humidity and a default boost pressure command, said control circuit producing said airflow signal as a function of said adjusted boost pressure command.

24. The system of claim 23 wherein said control circuit is configured to compute a boost multiplier as a function of said specific humidity and to compute said adjusted boost pressure command as a product of said boost multiplier and said default boost pressure command.

25. The system of claim 24 wherein said control circuit includes a boost multiplier map mapping a number of specific humidity values to a corresponding number of boost multiplier values, said control circuit determining said boost multiplier by mapping said specific humidity to an appropriate one of said number of boost multiplier values.

26. The system of claim 20 wherein said means for determining a specific humidity of air entering said intake manifold of said internal combustion engine includes:

a humidity sensor producing a humidity signal indicative of relative humidity of air entering said intake manifold;

a temperature sensor producing a temperature signal indicative of a temperature of air entering said intake manifold; and a pressure sensor producing a pressure signal indicative of a pressure of air entering said intake manifold;

and wherein control circuit responsive to said humidity signal, said temperature signal and said pressure signal to determine said specific humidity.

27. The system of claim 20 further wherein said means for determining a specific humidity of air entering said intake manifold of said internal combustion engine includes:

a humidity sensor producing a humidity signal indicative of relative humidity of ambient air;

a temperature sensor producing a temperature signal indicative of ambient air temperature; and a pressure sensor producing a pressure signal indicative of ambient air pressure; and wherein control circuit responsive to said humidity signal, said temperature signal and said pressure signal to determine said specific humidity.

28. A method of compensating for atmospheric humidity effects on the operation of an internal combustion engine, comprising:

determining a specific humidity of air entering an intake manifold of an internal combustion engine;

determining a rotational speed of said engine;

computing an adjusted ignition timing command as a function of said specific humidity, said rotational speed of said engine and a default ignition timing command; and controlling ignition timing of said engine based on said adjusted ignition timing command.

29. The method of claim 28 wherein the computing step further includes:

computing a timing multiplier as a function of said rotational speed of said engine;

computing a timing modifier as a product of said timing multiplier and said specific humidity; and computing said adjusted ignition timing command as a sum of said timing modifier and said default ignition timing command.

30. The method of claim 28 further including:

computing an adjusted boost pressure command as a function of said specific humidity and a default boost pressure command; and controlling pressure of air entering an intake manifold of said engine based on said adjusted boost pressure command.

* * * * *